Oct. 10, 1950 H. G. BUSIGNIES ET AL 2,524,765
RADIO BEACON

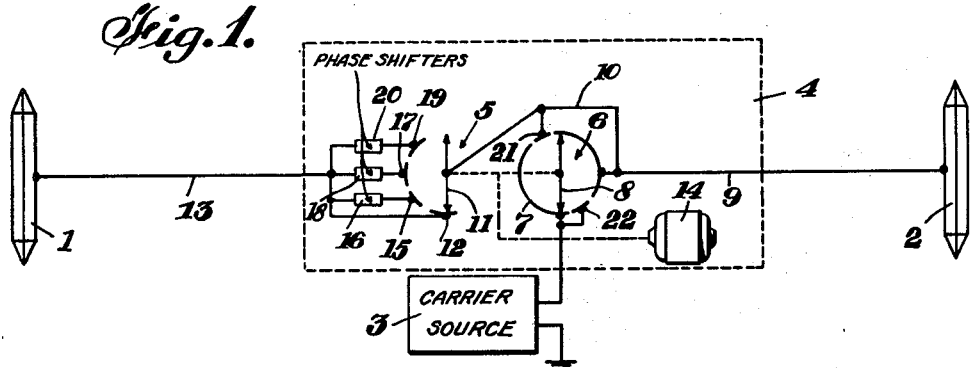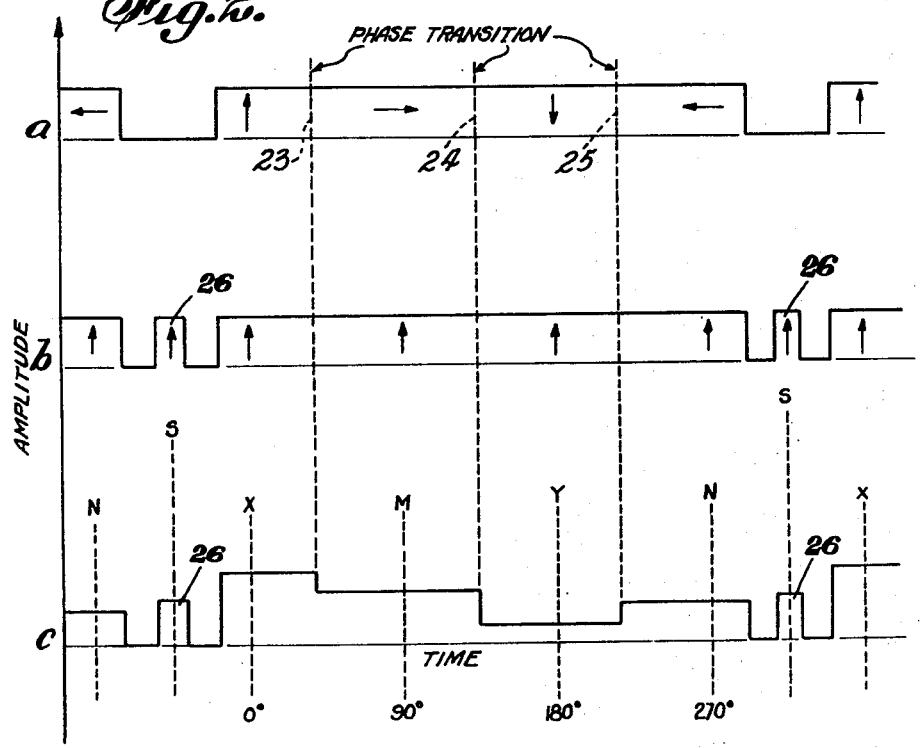

Filed July 31, 1945 2 Sheets-Sheet 2

INVENTORS
HENRI G. BUSIGNIES
PAUL R. ADAMS
BY
R. P. Morris
ATTORNEY

007# UNITED STATES PATENT OFFICE 2,524,765

RADIO BEACON

Henri G. Busignies, Forest Hills, N. Y., and Paul R. Adams, Cranford, N. J., assignors to Federal Telephone and Radio Corporation, New York, N. Y., a corporation of Delaware Application July 31, 1945, Serial No. 607,982

18 Claims. (Cl. 343—107)

This invention relates to radio beacons and more particularly to radio beacons particularly designed for use over long distance ranges.

For long range navigation, particularly for guiding aircraft over routes crossing oceans, it is desirable that radio beacons be provided which are reliable in operation so that the schedule of travel may be maintained substantially all of the time. Because of the long stretches between land bases across the oceans, it is essential that such beacons have a range of 1500 miles or more. For the usual radio range beacon, it has generally been considered more suitable to use relatively short waves. However, because of the mechanism of short wave propagation on transmission over long distance transmission and the varying states of the ionosphere, it is difficult to provide a short wave system to meet the universal time, direction and distance requirements. Such short wave stations would require a minimum of three different frequencies to assure reliability of operation over the various distance ranges. Furthermore, the short wave transmissions are subject to violent and rapid fading and are particularly subject to error when loop direction finders are used as the pick-up. One serious fault of the shorter radio waves is the lack of reliability of service over long distances because of the susceptibility of these short wavelengths to complete fade-outs of relatively long duration which appear to be associated with the cycles of solar and magnetic activities. Because of this factor, a high degree of continuity of waves appears to be unobtainable at these shorter wavelengths unless antenna powers of thousands of kilowatts are used. Power requirements for such systems are clearly impractical.

At the low and very low frequencies, on the other hand, the transmission is relatively stable. The variations are generally relatively slow and not extreme. There are no complete fadeouts of these longer wavelengths during periods of solar activity nor are there skip distance effects requiring the use of several frequencies at the transmitter. For a network of beacons a single low frequency could be used for each ground station. In spite of the greater simplicity of long wave beacons these have not hitherto been considered preferable to short wave beacons because at ordinary band widths and practicable powers the percentage of drop outs in reception at short waves is on the average lower than with long waves for the same power fed to the antenna. At extremely high powers (of the order of a hundred thousand watts average power for 1500 miles distant) this disadvantage of the long waves is less pronounced so that the long waves are approximately as reliable as the short waves for equal power applied to the antenna. This might lead one to expect that at still larger powers the long waves would give better reliability than the short waves for the same antenna feed power, but the utilization of such still larger powers for 1500 mile coverage has not been considered reasonable. For telegraphy and telephony, moreover, these powers are not economically justified since much lower powers will give 90% or 95% continuity of service. The trend in such services has therefore been toward short waves which give best continuity for moderate power.

In the case of a beacon for long range navigation, the seriousness of even 1% drop outs is so great that we must look for a system having about 99.9% reliability. Ignoring temporarily the impracticability of handling many megawatts of power in a long wave type of antenna, it appears from extrapolation of known data that for fifteen million watts average power fed to an antenna a suitably long wave system would give less drop outs than a short wave system. Thus, it appears that at these enormous powers the curves will have crossed so that for the same power the long waves now give less drop outs instead of more.

Of course, these tremendous powers could not be actually realized but by narrowing the band width far below that usually employed it is possible to produce with 50 kilowatts the same great signal-to-noise ratio as if the power were many times greater. This great signal-to-noise ratio then gives the same anomolous inversion of long and short waves in respect to their percentages of drop outs.

It is one object of the present invention to make use of such high powers (in relation to the distance to be covered) and such narrow band widths that the signal-to-noise ratio is many times higher than hitherto employed and to take full advantage of this increased signal-to-noise ratio by using long waves (40 to 150 kc.) in view of the discovery that at high signal-to-noise ratios the long waves have a lower percentage of drop outs than the short waves.

In particular it is an object to employ such high powers and such narrow band widths that at 1500 miles the average ground wave is comparable with the average atmospheric noise level and to make use of long waves (of about 80 kc.).

Because of the reliability and simplicity of radio beacons operating at these low frequencies, they are considered to be particularly suitable for long distance aerial navigation systems providing a high degree of continuity of waves with reasonable antenna powers. In order, however, to keep the power relatively low, for example between 20 and 100 kilowatts, and the effective reliability at a high level, we have found that it is desirable to provide a signalling system which will introduce side bands of very low frequency variation. For example, the carrier of the low frequency range should preferably be under 200 kilocycles and the modulation should not provide a range of frequency of more than ±300 cycles per second with the essential side bands within ±60 cycles per second.

The essential side bands are here defined as those which must be received to reproduce the separate course determining patterns within 1% accuracy. The reference signal need not be reproduced with this accuracy, an accuracy of 10% being sufficient.

It is an object of our invention to provide a radio beacon operating in the low frequency range and having modulation signals which are of very low frequencies.

It is a further object of our invention to provide a radio beacon for use over long ranges wherein the carrier frequency is maintained below a 200 kilocycle level and the essential modulation frequencies are maintained substantially under ±60 cycles per second.

For low frequency beacons of a type outlined above, the usual type of omnidirectional beacon cannot easily be adapted since this type of beacon requires generally modulation frequencies of higher order to provide the desired different signals for different directions. Futhermoe, the systems utilizing pulse energy from various points are not readily adaptable since the pulse frequencies themselves are generally higher than can be readily used for the narrow modulation band desired. Radio direction finder arrangements may be used but such systems will not enable craft to follow a straight line great circle path because of variations in wind drift, magnetic compass readings, and the like. We have reached the conclusion that the most suitable type of radio beacon with these long wave, low frequency signal systems is some variation of the fixed radio range. In the fixed radio range system as generally applied to land radio beacons and operating over a range of 200 miles or less, the modulation frequencies introduced by keying are generally too high for the purposes of our invention. Therefore, in accordance with our invention, we prefer to use a simple radio beacon consisting of spaced antenna elements together with means for supplying energy to these units at relatively different phase to provide different directive distribution patterns. Preferably, the phasing of the energy in the two antennas is varied between zero phase difference and 180° phase difference cyclically and at a sufficiently low rate of change to maintain the side bands at relatively low frequency levels. The phase shifting may be continuous but in the simplest form we provide a system in which the phase varies in steps, for example four steps, 0, 90, 180 and 270. This phase variation may take place over relatively long periods of time, the entire cycle taking place, for example, in one or two seconds. Preferably, we also provide a timing or synchronizing pulse intermediate each cycle during which period the power radiated reduces to zero in both antennas and permits the transmission of a pulse from one of the antennas. This four-stepped phase shift, as outlined, provides six equi-signal courses and permits courses to be followed immediate these equi-signal courses by measuring the ratio of energy between two of the switching cycles. The switching cycles to be compared will differ in different azimuthal directions and for this reason the synchronizing or timing signal is useful in order that the receiver circuit may be timed properly to receive the desired signals for comparison. This radio beacon, as described broadly above, will provide indications of courses with quadrant identification except for a region of about 20° variation about the ends of the line interconnecting the antennas. In these regions, however, if more than one beacon is provided, the ambiguity may be resolved by tuning to a second beacon to get a proper phase indicating quadrant.

It is a still further object of our invention to provide a radio beacon operating at low radio frequencies and at low modulation frequencies wherein the directivity pattern of the beacon is adjusted by phase shifting energy fed to the antenna units.

It is a still further object of our invention to provide a simple radio beacon wherein energy is fed to two spaced antennas in cyclically stepped phase shift variations to provide successive different radiation patterns.

It is a still further object of our invention to provide a radio beacon wherein patterns of different directivity are produced by relative phase shift of energy over predetermined cycles and a timing or synchronizing pulse is transmitted from one of the beacon antennas intermediate the cyclic variations.

While we have described briefly above the principles of our invention, a better understanding of the features and objects thereof may be had from the particular description of a specific embodiment thereof made with reference to the accompanying drawings, in which:

Fig. 1 is a schematic block circuit diagram of a radio beacon transmitter;

Fig. 2 is a graphical representation of the energization cycles of the antennas in accordance with Fig. 1;

Figure 3:
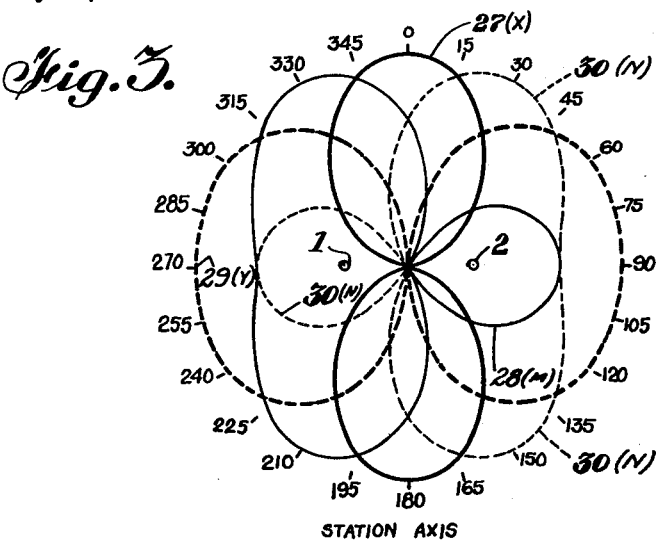
Fig. 3 is a polar diagram of the radiation patterns produced during the various cycles of operation of the system shown in Fig. 1.

Turning first to Fig. 1, two long wave radiating antennas are shown at 1 and 2 spaced apart preferably a half wavelength. A source of carrier frequency energy is shown at 3, preferably a source within the frequency range of from 40 to 150 kilocycles. A phase shifting network system 4 is provided for varying the relative phase of energy supplied from source 3 to antennas 1 and 2 in predetermined steps. For purposes of illustration, the phase adjusting system 4 may comprise two commutator arrangements 5 and 6 associated particularly with antennas 1 and 2 respectively. With the switches in the position shown, energy from source 3 is fed over contact 7 of commutator 6, brush 8 of commutator 6 and line 9 to antenna 2 and over contact 7 and brushes 8 of switch 6, line 10, brush 11 and contact 12 of switch 5 and line 13 to antenna 1. In this position, antennas 1 and 2 are energized with zero phase difference. A motor 14 serves to rotate brushes 8 and 11 in the same direction. In the next cyclic position of brushes 8 and 11, antenna 2 is still energized in the same phase relationship with respect to source 3. However, brush 11 has been rotated to contact 15 of commutator 5 so that antenna 1 is energized over phase shifter 16 which produces a 90° phase shift in energy supplied to antenna 1. In the next successive position, antenna 2 is again energized in the same phase relationship with respect to source 3 but brush 11 now supplies energy over contact 17 and phase shifter 18 to antenna 1. Phase shifter 18 produces a 180° phase shift of the energy supplied to antenna 1 with respect to that in antenna 2. In the fourth successive position, antenna 2 is again energized cophasally but brush 11 now supplies energy over 19 and 270° phase shifter 20 to antenna 1. In the next successive position, brush 8 of switch 7 passes over gaps to contacts 21, 22 of commutator 6 while brush 11 of commutator 5 makes no contact for energizing antenna 1. As brush 8 passes over the first gap to contacts 21 and 22, energy from the beacon drops to zero and then antenna 2 is again energized in the same phase relationship with respect to source 3 as in the previous positions. After passing contact 21, brush 8 again traverses the gap reducing the signal to zero and is then returned to the original position shown in Fig. 1 for repetition of the cycle of operation.

Turning now to Fig. 2, curve $a$ represents the energization of antenna 1 and curve $b$ the energization of antenna 2 for the cycle of operation of the system. The arrows in curves $a$ and $b$ present the relative phases of energy in the two antennas and the dotted lines 23, 24 and 25 of curve $a$ represent the transition points caused by switching the members or commutator members 5 and 6. It will be seen that intermediate each cycle of operation, timing or synchonizing pulses 26 are transmitted as shown in curve $b$. At some azimuth angle with respect to the center of radiation of the beacon, the energy which may be received is represented in curve $c$. It will be seen that this signal comprises a synchronizing pulse 26 provided with gaps on both sides thereof followed by a section wherein the zero phase is effective, designated by the broken line X. Another period when the 90° phase energy is effected represented by the line M, another period during which the 180° energy is effected represented by the letter Y and another period represented by the letter N during which the 270° energy is effected. While in the curves we have illustrated the signals as abruptly rising from one value to another, it should be understood that switches 5 and 6 are preferably designed to provide a rounding of the curves or gradual transition from one state to another to avoid high frequency side bands. This may be accomplished by suitably evaluating the various sectors of the commutators or by using other forms of commutators such as electronic control units in place of the simplified mechanical structure illustrated.

In Fig. 3, are shown in polar coordinates the various patterns representing the phasing positions of the rotary switches. In the position represented by X (Fig. 2) there is produced a symmetrical curve 27 represented in heavy solid lines. At the 90° position, a curve 28 represented by solid light lines is produced corresponding to the sector designated M. In curve 29 is shown in heavy dash lines the pattern represented by the switching sector Y and at 30 in light dash lines is shown the distribution produced in switching position N. It will be observed that in various sectors about the beacon, equi-signal paths may be readily determined and that by measuring the ratio of energy of certain of these patterns the departure from the equi-signal courses may be determined over a greater portion of the circumference around the beacon.

Figure 4:
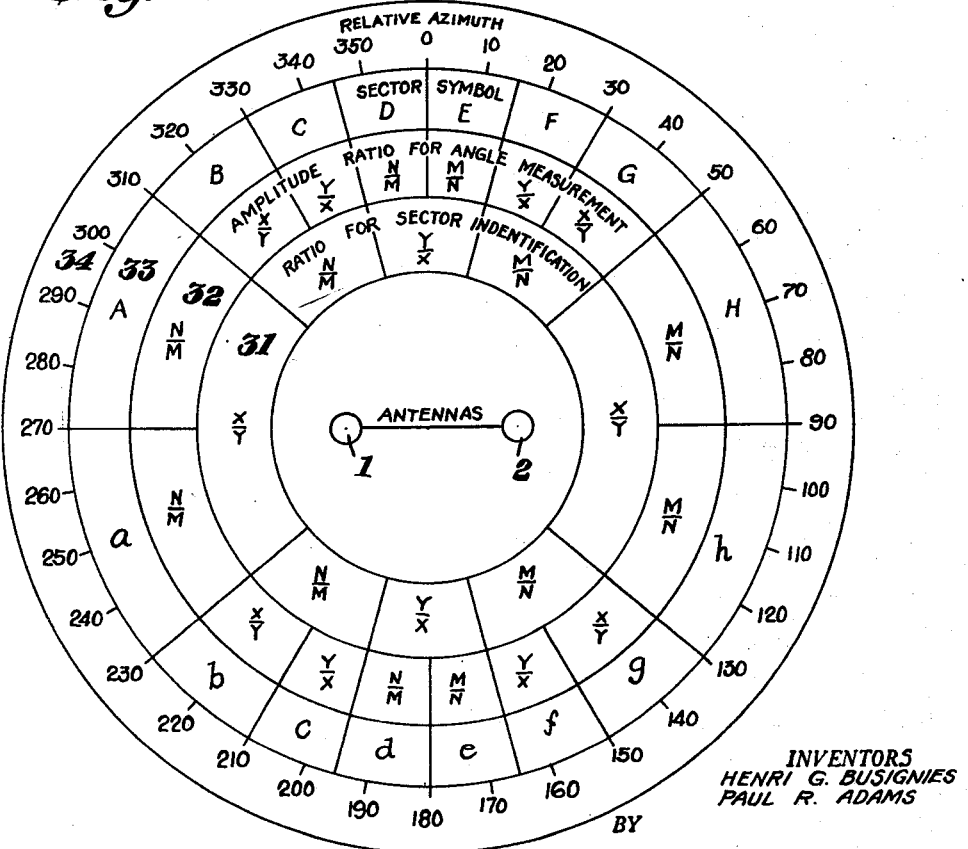
Fig. 4 is a diagram illustrating the various sectors and the signals best suited for directional comparison in these various sectors.

In order to determine which ratios to measure to determine the angular relationship of the craft with respect to the beacon, the chart shown in Fig. 4 may be used. If we consider in every instance the ratio to be measured is such that the amplitude is always less than unity, then the sector identification may be derived by measuring the ratios of energies $$\frac{M}{N}, \frac{X}{Y}, \frac{Y}{X}$$

and $$\frac{N}{M}$$

as indicated in the inner concentric ring 31. The amplitude ratio for measurement of the angle may be taken as a ratio of these same energies in accordance with the showing in the next concentric ring 32. It will be noted here that except in small sectors adjacent the line defined by antennas 1 and 2, the amplitude ratios for angular measurement and the ratios for sector identification differ so that ambiguities may be overcome. The various sectors are designated by separate symbols A to H inclusive, and $a$ to $h$ inclusive, as shown in the circle 33 while the angles about the beacon are designated in the outer circle 34.

Assuming that on the craft measurements of amplitude ratios are made from a ratio 1:1 to a ratio of .4:1 with a maximum error of 1%, the uncertainty in indicated angle resulting from this error at various azimuths is given in the table below.

TABLE

*Accuracy assuming attenuator accuracy of 1%*

| Pattern | Azimuth | Angular Error | Lateral Error at— | |
|---|---|---|---|---|
| | | | 1,500 Mi. | 150 Mi. |
| | | *Degrees* | *Miles* | *Miles* |
| M-N | 0° (180°) | ⅙ | 5.2 | .52 |
| M-N or X-Y | 15° (345°, 165°, 195°) | ⅓ | 8.7 | .87 |
| X-Y | 30° (330°, 150°, 210°) | ¼ | 6.5 | .65 |
| M-N or X-Y | 50° (310°, 130°, 230°) | ½ | 13 | 1.3 |
| M-N | 70° (290°, 110°, 250°) | ⅝ | 16 | 1.6 |
| M-N | 80° (280°, 100°, 260°) | 1½ | 39 | 3.9 |
| M-N | 90° (270°) | 6 | 157 | 15.7 |

It is seen that the error along the most favorable directions is substantially less than 1° and that it is no more than 1° in all directions excluding those within the 20° of the line adjoining the two antennas. In general, the beacon may be so oriented that signals within these sectors of poor definition need not be used. It is clear that for long range navigation, departures from course of the relative percentages and distances given above are not too important. Reliability of operation of the beacon is much more important for these long range operations than is sharpness of the course.

While we have described our invention in connection with a specific embodiment thereof, it should be understood that this description is made merely by way of illustration. Furthermore, it should be understood that by operating a radio beacon at the extreme radio frequencies outlined and with extremely narrow band width as set forth, reliability of service may be maintained with relatively low antenna power. The narrow band width serves to increase the effective signal-to-noise ratio making use of excessive power unnecessary. It is considered that in a system as outlined above the power radiated at the antennas may be maintained between values of 20 kilowatts in the polar climates and 70 kilowatts in the tropics where atmospherics are generally more severe. The preferred wave band of operation is generally between 60 and 80 kilocycles per second with a modulation or signalling frequency essential side bands between ±10 and ±60 cycles per second. The relatively narrow band available makes it desirable to retain the transient side band effects at a low level, for example under ±300 and preferably under ±80 cycles per second, to permit low frequency separation even though the higher frequency transients may be excluded in the receiver used with the system. Because of the low frequency transmission and the relatively slow signal variation, the receivers cooperating with this beacon effectively have the advantage of a slower operation and more accurate and reliable results. The energy from this beacon will consequently be relatively sluggish in operation but for long range navigation as outlined herein this ewill not be too great a disadvantage and will be offset to a large extent by the reliability of the service.

While we have described above a particular example and embodiment of our invention, it is to be distinctly understood that this is given merely by way of example and is not to be considered as a limitation on the scope of our invention as set forth in the objects thereof and in the accompanying claims.

We claim:

1. A radio beacon system comprising a directive pattern producing transmitter, means for operating said beacon at a carrier frequency under 200 kilocycles per second, means for producing signal variation of said carrier frequency, and means for substantially increasing the signal-to-noise ratio comprising devices for confining the essential side band variation of said signal variation within a band under ±80 cycles, per second.

2. A radio beacon comprising a directive radiator means, a transmitter operative on a carrier frequency within the range between 40 and 150 kilocycles per second, means for producing signal variations of said carrier frequency, and means for substantially increasing the signal-to-noise ratio comprising devices for confining the essential side band variation of said signal variation within the limits of from ±5 to ±60 cycles per second.

3. A radio beacon comprising a directive radiator means, a transmitter operative on a carrier frequency within the range between 40 and 150 kilocycles per second, means for producing cyclic changes in the directive pattern of said directive radiator means, and means whereby, in order to increase the signal-to-noise ratio, the said cyclic change producing means is so controlled as to confine the variation of essential side bands within the limits of from ±5 to ±60 cycles per second.

4. A radio guiding method, comprising transmitting radio frequency energy in a radio frequency band below 200 kilocycles per second, giving to said energy signal variations, and substantially increasing the signal-to-noise ratio by confining essential side band variations under ±60 cycles per second.

5. A radio guiding method comprising transmitting radio frequency energy directively within a band between 40 and 80 kilocycles per second, giving to said energy signal variations, and substantially increasing the signal-to-noise ratio by confining essential side bands within a band between ±5 and ±10 cycles per second.

6. Method of operating a radio beacon system over relatively long distances comprising, transmitting a directive pattern on a carrier frequency under 200 kilocycles per second, producing signal variation of said carrier frequency and substantially augmenting the signal-to-noise ratio thus obtainable by confining the essential side band variation of said signal variation within a band under ±80 cycles per second.

7. A radio guiding method for transmitting over relatively long distances, comprising directively transmitting energy at a frequency between 40 and 150 kilocycles per second and at an energy level under 80 kilowatts, giving to said energy signal variations, and substantially increasing the signal-to-noise ratio by confining essential side bands within a band of from ±10 to ±60 cycles per second.

8. A radio guiding method according to claim 7, wherein two radiating antennas are used and said signal variations are produced by cyclically repeated relative phase shift of the radio frequency energy supplied to said antennas.

9. A radio beacon comprising two spaced antenna units, means for supplying carrier frequency energy within a band of from 40 to 150 kilocycles thereto, means for altering the relative energization of said antennas at a given rate, and means whereby, in order to increase the signal-to-noise ratio, the said means for altering is so controlled as to confine the variations of essential side bands produced thereby substantially between ±10 to ±60 cycles per second.

10. A radio beacon comprising two spaced antenna units, means for supplying carrier frequency energy within a band of from 40 to 150 kilocycles thereto, means for altering the relative phase of energization of said antennas at a given rate, and means whereby, in order to increase the signal-to-noise ratio, the said means for altering is so controlled as to confine the variations of essential side bands produced thereby substantially between ±5 to ±60 cycles per second.

11. A radio beacon comprising two spaced antenna units, means for supplying carrier frequency energy within a band of from 60 to 80 kilocycles thereto, means for cyclically altering the relative phase of energization of said antennas at a give rate, and means whereby, in order to increase the signal-to-noise ratio, the said means for altering is so controlled as to confine the variation of essential side bands produced thereby substantially between ±5 to ±10 cycles per second.

12. A radio beacon comprising two spaced antenna units, means for supplying carrier frequency energy at a level below 80 kilowatts within a band of from 40 to 150 kilocycles thereto, means for altering the relative energization of said antennas at a given rate, and means whereby, in order to increase the signal-to-noise ratio, the said means for altering is so controlled as to confine the variation of essential side bands produced thereby substantially between ±5 to ±60 cycles per second.

13. A radio beacon comprising a pair of antennas spaced apart substantially one half a wavelength at the operating carrier frequency, and means for cyclically rotating the relative phasing of energy supplied to said two antennas in more than two steps to provide different directive patterns, said variation in relative phasing occurring relatively slowly to limit side band variation components substantially below 80 cycles per second.

14. A radio beacon comprising means for cyclically radiating a plurality of differently directed overlapping radiation patterns, whereby ratios of energy level of the different radiation patterns differ with changes in azimuth about the center of radiation of the beacon, and means for transmitting an omnidirectional timing pulse at a fixed time during each cycle of said directive radiation said fixed time being comprised in an interrupted period intermediate each directive radiation cycle.

15. A radio beacon comprising a pair of antennas spaced apart substantially one half a wavelength at the operating carrier frequency, said carrier frequency being under 200 kilocycles per second, means for cyclically varying the relative phasing of energy supplied to said two antennas, and means for energizing one of said antennas only intermediate the cycles of phase variation of said energization to provide an omnidirectional synchronizing radiation, and means whereby, in order to increase the signal-to-noise ratio said variation in relative phasing and said single energization are caused to occur relatively slowly to limit essential side band component variation substantially below ±60 cycles per second.

16. A radio beacon comprising a pair of antennas spaced apart substantially one half a wavelength at the operating carrier frequency, said carrier frequency being within a band between 40 and 150 kilocycles per second, means for cyclically varying the relative phasing of energy supplied to said two antennas in steps to provide different directive patterns, and means for energizing one of said antennas only intermediate the cycles of phase variation of said energization to provide an omnidirectional synchronizing radiation, and means whereby, in order to increase the signal-to-noise ratio said variation in relative phasing and said single energization are caused to occur relatively slowly to limit essential side band component variation substantially below ±60 cycles per second.

17. A radio beacon comprising a pair of antennas spaced apart substantially one half a wavelength at the operating carrier frequency, a source of carrier frequency, said carrier frequency being within a band between 40 and 150 kilocycles per second, means for cyclically varying the relative phasing of energy supplied to said two antennas from said source in 90° steps from zero to 270° to provide different directive patterns, and means for energizing one of said antennas only intermediate the cycles of said energization to provide an omnidirectional synchronizing radiation, said variation in relative phasing and said single energization occurring relatively slowly to limit the variation of essential side band components to a value between ±5 and ±60 cycles per second.

18. A radio beacon comprising a pair of antennas spaced apart substantially one half a wavelength at the operating carrier frequency, a source of carrier energy between 20 and 100 kilowatts, said carrier frequency being within a band between 60 and 80 kilocycles per second, means for cyclically varying the relative phasing of energy supplied to said two antennas from said source in 90° steps from zero to 270° to provide different directive patterns, and means for energizing one of said antennas only intermediate the cycles of said energization to provide an omnidirectional synchronizing radiation, said variation in relative phasing and said single energization occurring relatively slowly and gradually to limit the variation of essential side band components to a value between ±5 and ±60 cycles per second.

HENRI G. BUSIGNIES.
PAUL R. ADAMS.

REFERENCES CITED

The following references are of record in the file of this patent:

UNITED STATES PATENTS

| Number | Name | Date |
| --- | --- | --- |
| 1,394,056 | White | Oct. 18, 1921 |
| 1,667,792 | Martin | May 1, 1928 |
| 1,988,006 | Greig | Jan. 15, 1935 |
| 2,046,850 | Runge | July 7, 1936 |
| 2,094,333 | Smith | Sept. 28, 1937 |
| 2,142,648 | Linder | Jan. 3, 1939 |
| 2,184,843 | Kramer | Dec. 26, 1939 |
| 2,407,324 | O'Brien | Sept. 10, 1946 |
| 2,436,796 | De Rosa | Mar. 2, 1948 |

FOREIGN PATENTS

| Number | Country | Date |
| --- | --- | --- |
| 652,476 | Germany | Nov. 1, 1937 |
| 661,281 | Germany | June 15, 1938 |